United States Patent
Colombo (10) Patent No.: US 11,977,438 B2
(45) Date of Patent: May 7, 2024

(54) PROCESSING SYSTEM, RELATED INTEGRATED CIRCUIT AND METHOD

(71) Applicant: STMicroelectronics Application GMBH, Aschheim-Dornach (DE)

(72) Inventor: Roberto Colombo, Munich (DE)

(73) Assignee: STMicroelectronics Application GMBH, Aschheim-Dornach (DE)

(*) Notice: Subject to any disclaimer, the term of this patent is extended or adjusted under 35 U.S.C. 154(b) by 178 days.

(21) Appl. No.: 17/406,910

(22) Filed: Aug. 19, 2021

(65) Prior Publication Data

US 2021/0382779 A1    Dec. 9, 2021

Related U.S. Application Data

(63) Continuation of application No. 16/289,405, filed on Feb. 28, 2019, now Pat. No. 11,113,136.

(51) Int. Cl.
*G06F 11/00* (2006.01)
*G06F 11/07* (2006.01)
*G06F 11/10* (2006.01)

(52) U.S. Cl.
CPC ...... *G06F 11/0784* (2013.01); *G06F 11/0721* (2013.01); *G06F 11/0739* (2013.01); *G06F 11/0751* (2013.01); *G06F 11/0772* (2013.01); *G06F 11/1048* (2013.01)

(58) Field of Classification Search
CPC ............. G06F 11/0784; G06F 11/0721; G06F 11/0751
USPC ........................................ 714/1–57
See application file for complete search history.

(56) References Cited

U.S. PATENT DOCUMENTS

| | | | | |
|---|---|---|---|---|
| 7,346,812 B1* | 3/2008 | Wickeraad | .......... | G06F 11/2268 714/48 |
| 7,730,361 B2* | 6/2010 | Das | ...... | G06F 13/4247 714/48 |
| 2005/0283686 A1* | 12/2005 | Dart | ...... | G11C 5/147 714/54 |
| 2006/0112306 A1* | 5/2006 | Chessin | ...... | G06F 11/1024 714/6.32 |
| 2008/0016407 A1 | 1/2008 | Abernathy et al. | | |
| 2010/0153895 A1* | 6/2010 | Tetelbaum | ...... | G06F 30/3312 327/158 |
| 2011/0179314 A1 | 7/2011 | Patel et al. | | |

(Continued)

FOREIGN PATENT DOCUMENTS

WO     2010007469 A1     1/2010

OTHER PUBLICATIONS

STMicroelectronics, "AN4247 Application note Safety Manual for SPC570S family," Jul. 2015, DocID 024209, Rev 3, 61 pages.

*Primary Examiner* — Sarai E Butler
(74) *Attorney, Agent, or Firm* — Slater Matsil, LLP (57) ABSTRACT

A processing system includes a plurality of circuits configured to generate a plurality of error signals. The processing system further includes a plurality of error pads and a fault collection circuit configured to receive the plurality of error signals and to generate a respective combined error signal for each of the plurality of error pads. The fault collection circuit includes a combinational logic circuit configured to generate the combined error signal by selectively routing the plurality of error signals to the plurality of error pads as a function of a set of configuring bits.

20 Claims, 7 Drawing Sheets

(56) References Cited

U.S. PATENT DOCUMENTS

| | | | |
|---|---|---|---|
| 2012/0131384 A1* | 5/2012 | Zou | G06F 11/0766 |
| | | | 714/24 |
| 2013/0151891 A1* | 6/2013 | Piry | G06F 11/3058 |
| | | | 714/10 |
| 2013/0166993 A1 | 6/2013 | Lee et al. | |
| 2014/0019814 A1 | 1/2014 | McNairy et al. | |
| 2014/0032965 A1* | 1/2014 | Tsukamoto | G06F 11/0778 |
| | | | 714/30 |
| 2014/0058541 A1 | 2/2014 | Goepfert et al. | |
| 2014/0181581 A1* | 6/2014 | Flautner | G06F 11/00 |
| | | | 714/15 |
| 2014/0208151 A1* | 7/2014 | Fernandez | G05B 19/045 |
| | | | 714/2 |
| 2014/0325277 A1 | 10/2014 | Sonoda et al. | |
| 2015/0278006 A1 | 10/2015 | Iikura et al. | |
| 2015/0370625 A1 | 12/2015 | Nakajima | |
| 2016/0019131 A1 | 1/2016 | Biberdorf et al. | |
| 2016/0239663 A1 | 8/2016 | Healy et al. | |
| 2016/0266952 A1 | 9/2016 | Hofig et al. | |
| 2019/0272210 A1 | 9/2019 | Colombo | |

\* cited by examiner

PROCESSING SYSTEM, RELATED INTEGRATED CIRCUIT AND METHOD

CROSS-REFERENCE TO RELATED APPLICATIONS

This application is a continuation application of U.S. patent application Ser. No. 16/289,405 filed on Feb. 28, 2019, which claims the benefit of Italian Application No. 102018000003234, filed on Mar. 2, 2018. These applications are hereby incorporated herein by reference.

TECHNICAL FIELD

Embodiments of the present disclosure relate generally to processing systems, such as micro-controllers.

BACKGROUND

Figure 1:
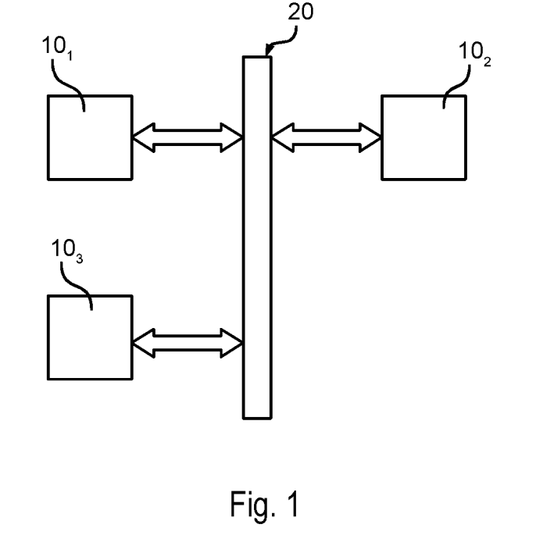
FIG. 1 shows a typical electronic system including a plurality of processing systems.

FIG. 1 shows a typical electronic system, such as the electronic system of a vehicle, including a plurality of processing systems 10, such as embedded systems or integrated circuits, e.g., a Field Programmable Gate Array (FPGA), Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to the vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Figure 2:
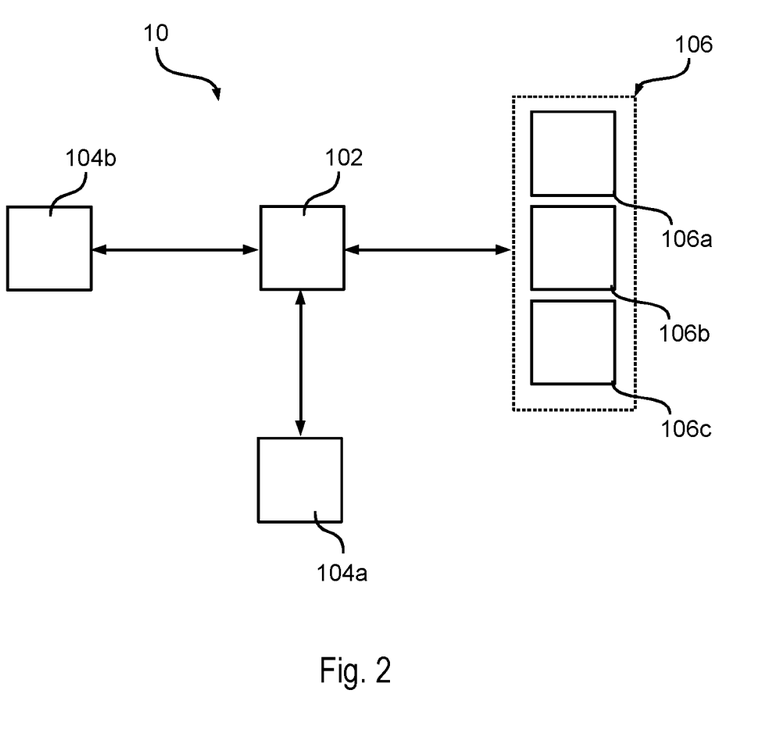
FIG. 2 shows an exemplary processing system.

FIG. 2 shows a block diagram of a typical digital processing system 10 corresponding to any of the previously mentioned processing systems $10_1$, $10_2$ and/or $10_3$, such as a micro-controller.

In the embodiment considered in FIG. 2, the processing system 10 includes at least one processing unit 102, such as a microprocessor, usually the Central Processing Unit (CPU), programmed via software instructions.

In the example considered, the software executed by the processing unit 102 is stored in a non-volatile program memory 104a, such as a Flash memory or EEPROM. Thus, the memory 104a is configured to store the firmware for the processing unit 102, wherein the term firmware includes both the software of a micro-processor and the programming data of a programmable logic circuit, such as a FPGA. Similarly, the processing unit 102 may be associated with one or more volatile memories 104b, such as a Random-Access Memory (RAM), e.g. a Static Random-Access Memory (SRAM) or a Dynamic Random-Access Memory, e.g. for storing temporary results of the program executed by the processing unit 102. Generally, each memory 104a or 104b may be integrated with the processing unit 102 in a single integrated circuit, or the memory may be in the form of a separate integrated circuit and connected to the processing unit 102, e.g. via the traces of a printed circuit board.

In the example considered, the processing unit 102 may be associated with one or more further resources 106, such as:

one or more communication interfaces, such as a Universal Asynchronous Receiver/Transmitter (UART), Serial Peripheral Interface (SPI), Inter-Integrated Circuit (I2C), Controller Area Network (CAN), Ethernet, and/or debug interface; and/or one or more analog-to-digital and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a PWM (Pulse-Width Modulation) driver.

Future generation processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.). For example, complexity is expected to increase in particular in the context of the forthcoming Car2X and autonomous driving world, because safety and security of the processing systems 10 will become more and more relevant.

For this reason, the processing units 10 should be able to correctly handle errors. For example, an error-correcting code (ECC) function of a memory of the processing system 10 may detect and possibly corrects data errors affecting the memory. Similarly, other fault-detection functions may permit system-level diagnostics of the timers, ADC, communication interfaces and/or other modules.

In response to an error, the processing system may generate interrupts and/or resets. In various applications it may be necessary that one or more errors should also be reported to other processing systems. For example, when an error signal is received, the processing system 10 may drive an error pin according to given protocol, thereby helping to ensure safety and reliability of the complete system.

SUMMARY

In view of the above, various embodiments of the present disclosure to provide solutions able to improve the behavior of a processing system, such as a micro-controller, in response to an error signaled by one of the circuits of the processing system.

According to one or more embodiments, one or more of the above objectives is achieved by a processing system having the features specifically set forth in the description that follow. Embodiments moreover concern a related integrated circuit and method.

As mentioned before, various embodiments of the present disclosure relate to a processing system. In various embodiments, the processing system includes a plurality of circuits configured to generate a plurality of error signals. For example, the error signals may be generated by:

a memory supporting an error detection and/or correction function;

a processing unit configured to generate an error signal in response to a hardware and/or software failure; and/or a communication interface configured to generate an error signal corresponding to a hard error signal indicative of a hardware failure and/or a soft error signal indicative of a data transmission error.

In various embodiments, the processing system includes a plurality of error pads and a fault collection circuit.

Specifically, in various embodiments, the fault collection circuit is configured to receive at input the error signals and generate a respective combined error signal for each of the error pads. For example, in various embodiments, the fault collection circuit includes a combinational logic circuit configured to generate the combined error signal by selectively routing the error signals to the error pads as a function of a first set of configuring bits.

For example, in various embodiments, the combinational logic circuit includes a respective first combinational sub-circuit for each of the error signals. Specifically, each first sub-circuit is configured to receive at input a respective error signal and a first plurality of configuration bits, one for each error pad. Next, each first sub-circuit generates for each error pad a respective output signal by performing a first logic operation between the received error signal and a respective configuration bit of the first plurality of configuration bits. In various embodiments, the combinational logic circuit includes moreover a respective second combinational sub-circuit for each error pin, wherein each second combinational sub-circuit is configured to receive at input a respective output signal from each of the first combinational circuit and generates a respective combined error signal for the respective error pad by combining the received output signal via a second logic operation. For example, the first logic operation may be an AND operation, and the second logic operation may be an OR operation.

In various embodiments, the processing system includes moreover at least one safety-critical pad. Specifically, each safety-critical pad is associated with a respective interface circuit configured to set the electric level of the safety-critical pad as a function of a safety control signal. In this case, the fault collection circuit may be configured to receive at input the error signals and generate a respective safety control signal for each of the safety-critical pads.

For example, in various embodiments, the fault collection circuit includes a second combinational logic circuit configured to generate the safety control signal by selectively routing the combined error signals to the safety-critical pads as a function of a second set of configuring bits. For example, the second combinational logic circuit may include a respective combinational sub-circuit for each of the safety-critical pads. Specifically, each combinational sub-circuit is configured to receive at input the combined error signals and a second plurality of configuration bits and generate for each combined error signals a respective output signal by performing a third logic operation between a respective combined error signals and a respective configuration bit of the second plurality of configuration bits. Next, each combinational sub-circuit generates a respective safety control signal for the respective safety-critical pad by combining the respective output signals via a fourth logic operation. For example, the third logic operation may be an AND operation, and the fourth logic operation may be an OR operation.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 3 to 9 parts, elements or components which have already been described with reference to FIGS. 1 and 2 are denoted by the same references previously used in such Figures; the description of such previously described elements will not be repeated in the following in order not to overburden the present detailed description.

As mentioned before, various embodiments of the present disclosure relate to solutions for managing errors within a processing system.

Figure 3:
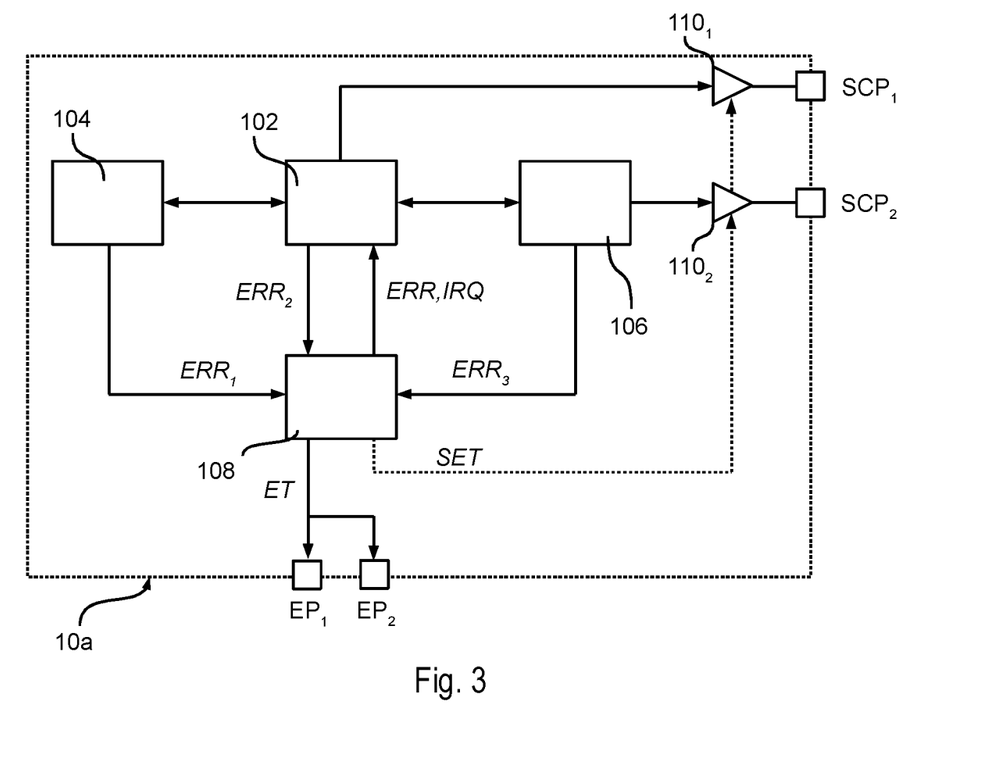
FIG. 3 shows an embodiment of a processing system including a fault collection circuit providing a combined error signal to an error pin.

FIG. 3 shows an embodiment of a processing system ma including a processing unit 102, one or more memories 104, such as a non-volatile memory 104a and/or a volatile memory 104b, and possible one or more further resources 106. Accordingly, the description of FIG. 2 fully applies also to the system of FIG. 3.

In the embodiment considered, at least one of the blocks 102, 104 and 106 may generate at least one error signal ERR. For example, such error signals ERR may be generated by at least one of:

a memory 104 supporting an error detection and/or correction function, which generates an error signal $ERR_1$ when the data read from the memory 104 contain errors and/or when data could not be written to the memory;

a processing unit 102 configured to generate an error signal $ERR_2$ in response to a hardware and/or software failure;

a communication interface 106 configured to generate an error signal ERR3, corresponding to a hard error signal indicative of a hardware failure and/or a soft error signal indicative of a data transmission error.

Additionally or alternatively, error signals may be generated by monitoring the supply voltage of the processing system 10a (e.g. in order to detect over and/or under voltage conditions), the clock signal of the processing system 10a (e.g. in order to detect the absence of a clock signal), and/or the temperature of the processing system 10a (e.g. in order to detect whether the current operating temperate is out of range).

In the embodiment considered, the various error signals ERR are provided to a fault collection circuit 108.

Specifically, in the embodiment considered, the fault collection circuit 108 is configured to generate an error trigger signal ET, which is provided to an error pad/pin EP of the integrated circuit including the processing system 10a. Generally, the term integrated circuit does not imply that the die is mounted within a package, but e.g. the die could also be mounted directly on a printed-circuit-board (PCB). Thus, the term pad is used to identify the pad of the die of the integrated circuit and the term pin identifies the pin or lead of an optional external package of the integrated circuit. Thus, when using the term "pad/pin" this indicates that the die has a pad and in case an external package is used, also the package has a corresponding pin, which is connected to the respective.

In various embodiments, the fault collection circuit 108 may also provide the error signal(s) ERR to the processing unit 102 and/or to one or more of the resources 106. For this purpose, the fault collection circuit 108 may also generate one or more interrupt signals IRQ, which are provided to the processing unit 102.

Figure 4:
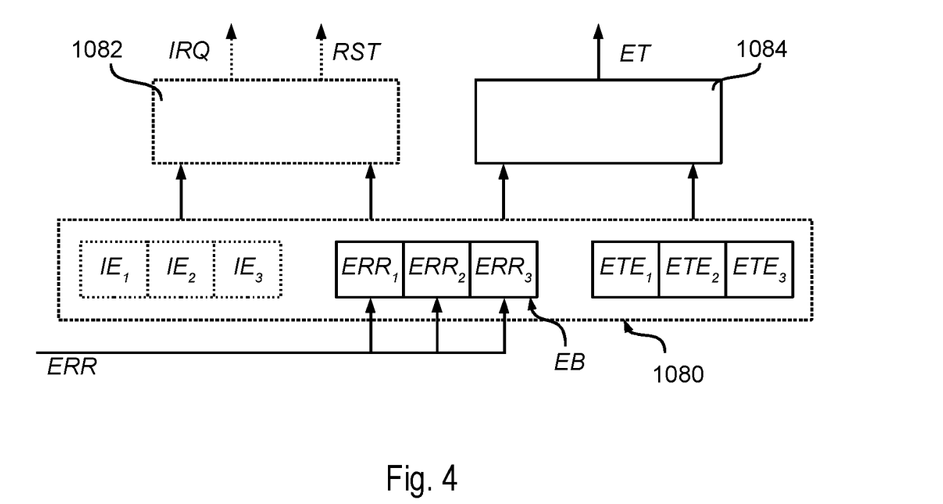
FIG. 4 shows a first embodiment of the fault collection circuit of FIG. 3.

For example, FIG. 4 shows a possible embodiment of the fault collection circuit 108.

In the embodiment considered, the fault collection circuit 108 includes a register 1080. Specifically, in the embodiment considered, the register 1080 includes one or more error bits EB for storing the value of the error signals ERR. For example, considering the exemplary case of three error signals $ERR_1 \ldots ERR_3$, the register 1080 may include a corresponding number of error bits EB.

In the embodiment considered, the fault collection circuit 108 includes also an error trigger generator circuit 1084. Specifically, the error trigger generator circuit 1084 is configured to generate the error trigger signal ET as a function of the content of the error bits EB of the register 1080. The error bits EB are purely optional and the error trigger generator circuit 1084 may generate the error trigger signal ET also directly as a function of the error signal(s) ERR.

In various embodiments, the behavior of the error trigger generator circuit 1084 may also be programmable, e.g. by setting one or more configuration bits in the register 1080. For example, in the embodiment considered, the register 1080 includes a respective error trigger enable bit ETE for each of the error signals $ERR_1$, $ERR_2$, $ERR_3$. For example, in various embodiments, the content of these error trigger enable bits ETE may be programmed by the processing unit 102 and/or during a configuration phase of the processing system 10a, e.g. by reading the corresponding configuration information from a non-volatile memory, such as the memory 104a.

Thus, essentially the signal ET corresponds to a combined error signal determined by combining the error signals ERR as a function of the error trigger enable bits ETE.

For example, by setting the error trigger enable bits ETE, the processing system 10a may be configured to signal only safety critical errors via the signal ET to the error pin/pad EP (such as uncorrectable data read errors, hardware failure of the processing unit 102 and/or one of the resources 106, etc.). Conversely, minor errors, which do not influence the safety of the system may not be signaled to the error pin/pad EP. For example, assuming a memory with error correction function, an uncorrectable error (e.g. a three bits error upon reading data from a non-volatile memory able to correct up to two-bit errors) may be:
  safety critical, e.g. when reading (fetching) code to be executed from the memory, insofar as this may result in an incorrect execution behavior; or
  not safety critical, e.g. when reading the data of a JPEG picture from the memory.

Accordingly, due to an error, the circuits of the processing system 10a may not operate correctly, possibly generating incorrect signals at the pins/pads of the processing system 10a. Some of the pins/pads of the processing system 10a may thus be safety-critical pins/pad, i.e. pins/pads which may generate critical situations when driven incorrectly. For example, in FIG. 3 is shown schematically a first safety-critical pin $SCP_1$ which is driven by the processing unit 102 and a second safety-critical pin $SCP_2$ which is driven by a resource 106, such as a communication interface or a PWM half-bridge driver.

Generally, each input/output pin/pad of the processing system 10a is usually associated with a respective driver circuit no, which is configured to drive the respective pin/pad as a function of the signal received from the respective block, e.g. the processing system 102 and the hardware resources 106. Generally, between the driver circuits no and the blocks of the processing system 10a may also be arranged a dedicated logic, such as a crossbar, permitting a configuration of the pin-mapping.

Accordingly, in various embodiment, the driver circuit no of the safety-critical pins/pads SCP is configured to set the output level of the respective pin to a given safety state in response to a signal SET. The output level, such as a high-impedance state or a given logic level (high or low), may depend on the specific application needs. In various embodiments, the "safety state" is intended to be compliant to the description provided by the ISO2626 specification.

Accordingly, in various embodiments, the fault collection circuit 108 may be configured to generate also the signal SET for the driver circuits 110 in order to put one or more of the safety-critical pins/pads SCP into a safety state. For example, in various embodiments, the signal SET may correspond to the signal ET. Alternatively, the circuit 1084 may be configured to generate the signal SET as a function of the error bits EB and possible one or more configuration bits stored in the register 1080 (similar to the bits ETE).

Accordingly, in the embodiment considered, the forwarding of the errors ERR to the error pin EP (and thus an external device) and optionally the switching of the pins/pads SCP are independent from the operation of the processing unit 102, e.g. the software executed by a microprocessor 102.

As mentioned before, in addition to controlling the external behavior of the processing system ma (error pins EP and optional safety-critical pins SCP), the fault collection circuit 108 may also generate one or more internal signals, such as the generation of a (non-maskable or maskable/configurable) interrupt signal IRQ and/or a reset signal RST, the activation of a debug mode, etc. For example, the one or more interrupts IRQ may be provided to the processing unit 102 in order to trigger a given software routine, while the reset signal RST may reset one or more circuits of the processing system 10a (or possibly the complete processing system 10a).

Generally, the error trigger signal ET may also be used for this purpose. Conversely, in the embodiment considered, the fault collection circuit 108 includes an additional internal reaction circuit 1082. Specifically, in the embodiment considered, the internal reaction circuit 1082 is configured to generate one or more interrupt signals IRQ and/or reset signals RST as a function of the error bits EB or directly the signals ERR. Generally, the internal reaction circuit 1082 is purely optional, because the processing system 10*a* may also not perform any internal reaction in response to the error signals ERR.

Also the behavior of the internal reaction circuit 1082 may be programmable, e.g. by setting one or more configuration bits in the register 1080. For example, in the embodiment considered, the register includes (in addition to the error trigger enable bits ETE) a respective interrupt enable bit IE for each of the error signals $ERR_1$, $ERR_2$, $ERR_3$. For example, in various embodiments, the content of these interrupt enable bits IE may be programmed by the processing unit 102 and/or during a configuration phase of the processing system 10*a*, e.g. by reading the corresponding configuration information from a non-volatile memory, such as the memory 104*a*.

In order to simplify the data exchange between the processing unit 102 and the registers 1080, the register 1080 may be directly addressable by the processing unit 102, so called special function register of the processing unit 102.

Accordingly, in the embodiment considered, the fault collection circuit 108 is configured to generate a combined error signal ET (e.g., in the form of a trigger signal) at the error pin EP as a function of the error signals ERR. Accordingly, the error pin EP may be connected to an external device, such as another processing system, which e.g. may perform one or more steps in response to the combined error signal/error trigger ET.

The information provided by the error pin EP may thus be safety critical itself. For example, in the automobile sector, the ISO 26262 standard "Road vehicles—Functional safety" dictates the rules to be followed in order to classify a system as safety compliant. The real implementation of those rules is up to the system designers, which can translate them in different architecture.

For example, a possible solution for a fault collection circuit 108 able to handle an error pin EP is described in document "AN4247 Application note Safety Manual for SPC570S family", STMicroelectronics, July 2015, DocID 024209 Rev 3. Specifically, in this document is described a fault collection circuit 108 having two external error pins/pads (see in particular section "4.5 Error Out Monitor (ERRM)"), i.e. an error pin $EP_1$ and an error pin $EP_2$. Specifically, the error signal ET provided to both error pins/pads $EP_1/EP_2$ is the same, i.e. for the fault free state of the pins/pads the external device should detect the same signals. Thus, the external device may also detect if the error pins $EP_1/EP_2$ are not working properly. For example, such a two pin configuration permits that the external device may detect a pin failure without dedicated software, e.g. through a combinatorial logic (e.g. an XOR port).

The inventor has however observed that such a two-pin configuration may be too limiting for a wide spectrum of applications.

Figure 5:
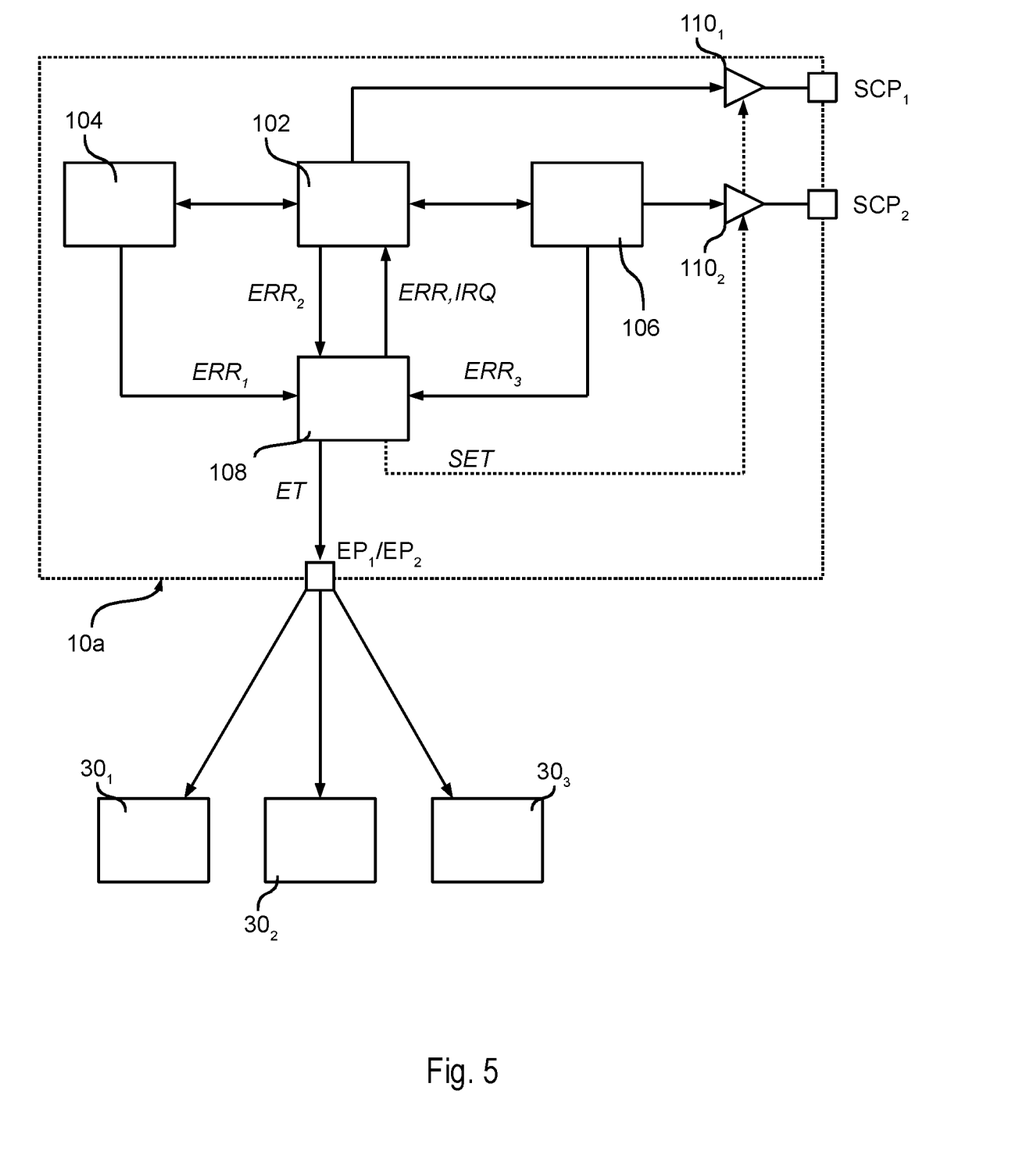
FIG. 5 shows an embodiment of a system wherein the combined error signal of FIG. 3 is provided to one or more external devices.

For example, FIG. 5 shows an example, wherein the fault collection circuit 108 generates again an error signal ET as a function of one or more internal error signal ERR (i.e. internal with respect to the processing system 10*a*). Specifically, in the example considered, the combined error signal ET is provided to a plurality of external devices, such as device 30₁, 30₂ and 30₃. Specifically, these devices 30 may be configured to perform different operations in response to different errors. For example, the device 30₁ may restart the processing system 10*a* in a down-grade/safety state, or may switch off the processing system 10*a* and switch to a redundant processing system 10*a*.

However, when using a single error pin EP or two redundant error pads/pins $EP_1/EP_2$ the same combined error signal ET is provided to all external devices 30. Accordingly, the inventor has observed that it would be useful that the error pins/pads EP used to report externally an internal failure ERR are increased. Moreover, is would be advantageously that the processing systems 10*a* renders it possible to configure individually for each error pin or couple of error pins EP the respective error types to be reported. For example, the device 30₁ may handle given hardware errors of the processing system 10*a*, while the device 30₂ may be a reporting module configured to merely collect any kind of error signal.

In this respect, the inventor has observed that also the number of pins/pads assigned to each error type should preferably be configurable, insofar as not all errors may contain safety relevant information. For example, the errors reported to the device 30₁ may be safety relevant, thus using two redundant error pins, while the combined error signals provided to the devices 30₂ and 30₃ may only be reported via a single error pin.

In the following will thus be described an embodiment of a fault collection circuit 108 configured to control the routing of the internal error signals ERR to a plurality of pre-assigned error pins/pads EP taking into account also the type of failure/error. In various embodiments, the fault collection circuit 108 is also able to generate the control signals in order to control operation of one or more safety-critical pins/pads SCP.

Figure 6:
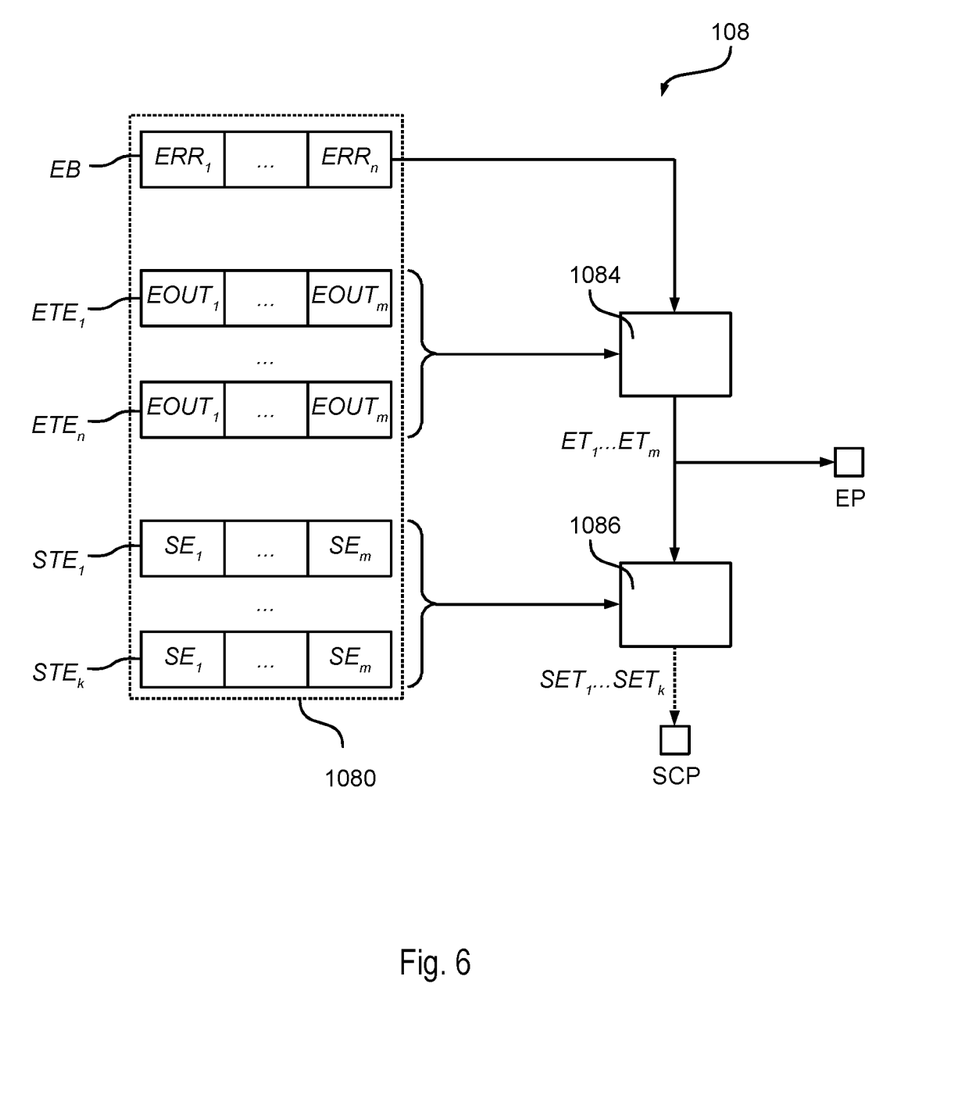
FIGS. 6, 7 and 8 show a second embodiment of the fault collection circuit of FIG. 3.

Specifically, FIG. 6 shows an embodiment of a fault collection circuit 108 configured to receive at input a given number n of error signals $ERR_1, \ldots, ER_n$ and generate at output:

a first group of a given number m of combined error signals $ET_1, \ldots, ET_m$ for a corresponding number of error pins/pads EP, and a second group of a given number k of safety control signals $SET_1, \ldots, SET_k$ for a corresponding number of safety-critical pins/pads SCP.

In various embodiments, the number n of error signals is greater than the number m of error pins/pads EP. Conversely, the number k of safety-critical pins/pads SCP may be greater than the number m of error pins/pads EP. For example, in various embodiments, the processing system 10*a* includes m=4 error pins/pads EP and k=32 safety-critical pins/pads SCP.

In the embodiment considered, the fault collection circuit 108 includes again a register 1080 including a given number n of error bits EB for storing the error signals $ERR_1 \ldots ERR_n$. In the embodiment considered, the error bits EB are again provided to an error trigger generator circuit 1084. Generally, the error bits EB are purely optional insofar as the error trigger generator circuit 1084 may also receive at input directly the error signals $ERR_1 \ldots ERR_n$.

Specifically, in the embodiment considered, the error trigger generator circuit 1084 is configured to generate the m combined error signals $ET_1 \ldots ET_m$ as a function of the error type. Accordingly, generally, the error trigger generator circuit 1084 is configured to selectively route the error signals ERR to the error pins EP. For this purpose, the circuit 1084 may be associated with respective configuration information enabling the error signals ERR to be routed to the error pins EP.

Specifically, in the embodiment considered, the register 1080 includes for each error signal $ERR_1 \ldots ERR_n$ a respective set $ETE_1 \ldots ETE_n$ of routing information bits for the respective error signal ERR. Specifically, in the embodiment considered, each set of routing information bits ETE include a respective bit EOUT for each error pin EP, i.e. each set of routing information bits $ETE_1 \ldots ETE_n$ includes respective bits $EOUT_1 \ldots EOUT_m$. Accordingly, the bits $EOUT_1 \ldots EOUT_m$ of a given set of routing information bits ETE indicate the error pads $EP_1 \ldots EP_m$ to which the respective error signal ERR has to be routed.

Figure 7:
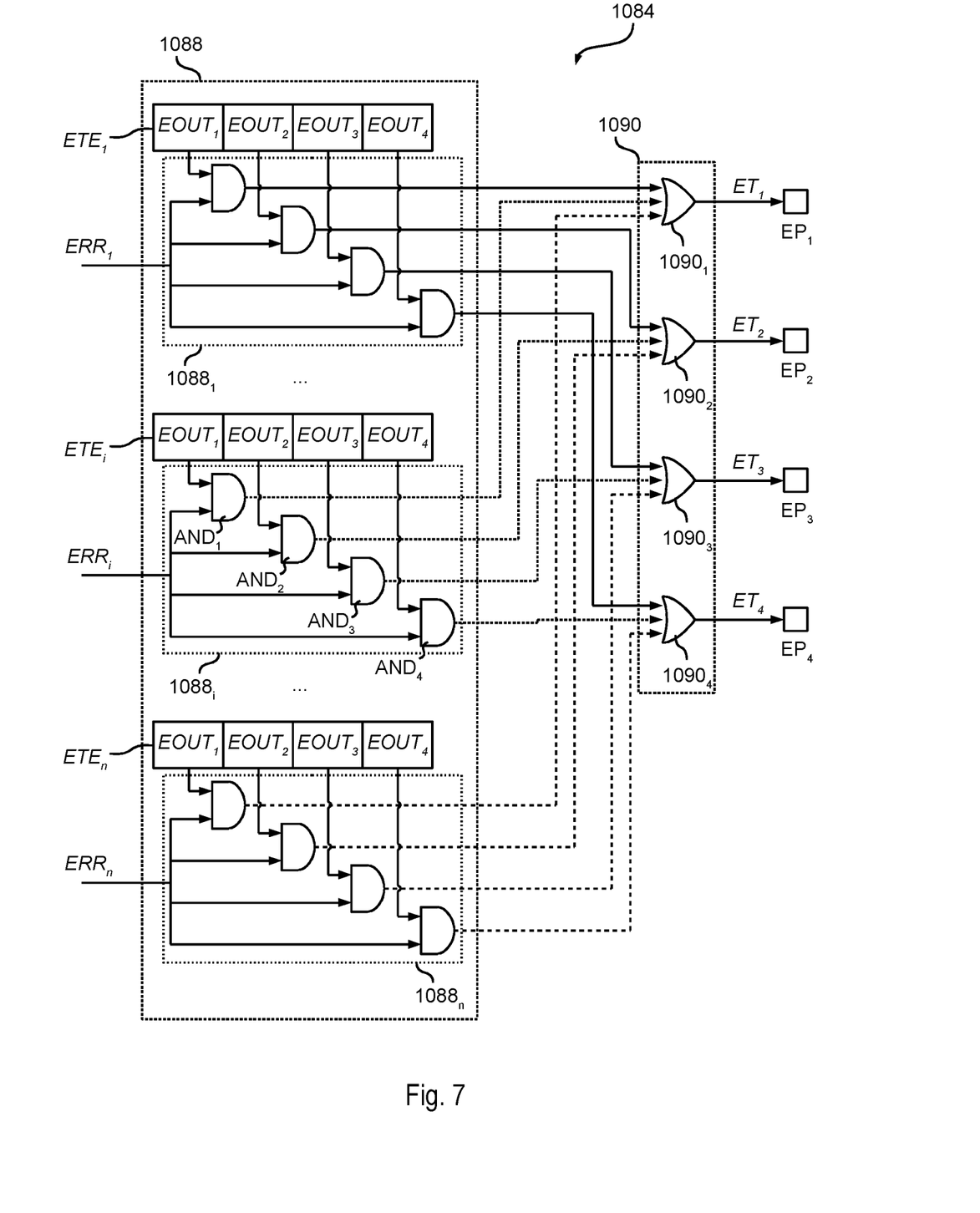

FIG. 7 shows a possible embodiment of the error trigger generator circuit 1084.

Specifically, as mentioned before, the error trigger generator circuit 1084 is implemented with a combinational circuit, which receives at input the error signals $ERR_1 \ldots ERR_n$/error bits EB and provides at output the combined error signals $ET_1 \ldots ET_m$, for example four combined error signals $ET_1$, $ET_2$, $ET_3$ and $ET_4$ for four error pins $EP_1$, $EP_2$, $EP_3$ and $EP_4$.

In the embodiment considered, the error trigger generator circuit 1084 includes for each error signal $ERR_1 \ldots ERR_n$ a corresponding combinational circuit $1088_1 \ldots 1088_n$. Specifically, each of the circuits $1088_1 \ldots 1088_n$ receives at input a respective error signal ERR and provides at output m signals, one for each combined error signal ET/error pin EP. Specifically, each of the m signals is generated by combining the respective error signal ERR with a respective bit $EOUT_1 \ldots EOUT_m$ of the set of routing information bits $ETE_1 \ldots ETE_n$ associated with the respective error signal ERR. Thus, a given circuit $1088_i$ (with i=1 . . . n) is configured to:

- receive at input the respective error signal $ERR_i$ and the bits $EOUT_1 \ldots EOUT_m$ of the respective set of routing information bits $ETE_i$, and
- generate each of the m trigger signals by performing a logic combination of the error signal $ERR_i$ with a respective bit $EOUT_1 \ldots EOUT_n$, of the set of routing information bits $ETE_i$.

For example, assuming that the error signal ERR is set to high when an error occurs and a bit EOUT is set to high for enabling the forwarding of the error signal, each of the m signals may result from a logic AND operation between the error signal $ERR_i$ with a respective bit $EOUT_1 \ldots EOUT_m$ of the set of routing information bits $ETE_i$. For example, in FIG. 7 are shown four AND gates $AND_1$, $AND_2$, $AND_3$ and $AND_4$, which thus provide at output the following signals: $ERR_i$ AND $EOUT_1$, $ERR_i$ AND $EOUT_2$, $ERR_i$ AND $EOUT_3$ and $ERR_i$ AND $EOUT_4$.

In the embodiment considered, the error trigger generator circuit 1084 includes moreover a combinational logic circuit 1090 configured to combine the signals provided by the circuits $1088_1 \ldots 1088_n$, which belong to the same error pin EP. For example, in the embodiment considered, the circuit 1090 includes for each error pin $EP_1 \ldots EP_m$ a respective sub-circuit $1090_1 \ldots 1090_m$. Specifically, each sub-circuit $1090_j$ (with j=1 . . . m) receives at input the j-th signal from each circuit $10881 \ldots 1088n$ and provides at output the combined error signal $ET_j$ for the respective error pin $EP_j$.

For example, again assuming the exemplary logic levels described in the foregoing, each of the sub-circuit $1090_1 \ldots 1090_m$ may be implemented with a logic OR gate. Accordingly, in the embodiment considered, the error signals ET may be expressed as:

$$ET_j = OR_{(i=1\ldots n)}\{EOUT_{j,i} AND ERR_i\}$$

where $EOUT_{j,i}$ indicates that the corresponding bit $EOUT_j$ belongs to the set of routing information bits $ETE_i$. For example, in the exemplary embodiment, the combined error signal $ET_1$ may be expressed as:

$ET_1 = EOUT_{1,1}$ AND $ERR_1$ OR $EOUT_{1,2}$ AND $ERR_2$
OR $EOUT_{1,3}$ AND $ERR_3$ OR $EOUT_{1,4}$ AND $ERR_4$.

Thus, by setting the bits EOUT of a set of routing information bits $ETE_i$, the system and/or software developer may select the error pins EP to which a given error signal $ERR_i$ should be routed. Generally, the bits EOUT of the set of routing information bits ETE may be organized in various modes. For example, each set of routing information bits ETE may be stored in a respective register, i.e. one for each error signal ERR. Similarly, all bits EOUT associate with a given error pin EP may be stored in a respective register, i.e. one for each error pin/pad EP.

For example, only critical hardware errors may be routed to the error pin $EP_1$, e.g. by setting the bit $EOUT_1$ of the set of routing information bits ETE associated with critical errors, such as hardware errors. Conversely, any kind of error may be routed to the error pin $EP_3$, e.g. by setting the bit $EOUT_3$ of each set of routing information bits ETE, i.e. for all errors.

Thus, in various embodiments, a safety critical configuration may be obtained by using the same bit configuring for two error pins EP, e.g. $EOUT_3 = EOUT_1$ for each set of routing information bits ETE. For example, the error pin $EP_3$ may be configured as redundant pin for the error pin $EP_1$ by setting the bit $EOUT_3$ of the set of routing information bits ETE associated with the same critical errors, i.e. an error pin is configured as redundant when all bits EOUT associated with the pin have the same value as the bits EOUT associated with another error pin.

As mentioned before, the fault collection circuit 108 may also be configured to control the operation of safety-critical pins/pads SCP. For example, FIG. 6 shows that the fault collection circuit 108 may also include a further combinational circuit 1086 configured to control the operation of one or more safety-critical pads/pins SCP. Specifically, in the embodiment considered, the circuit 1086 is configured to control the operation of the safety-critical pins/pads SCP by selectively routing the error trigger signals ET to the safety-critical pins SCP. Accordingly, the circuit 1086 receives at input the m combined error signals $ET_1 \ldots ET_m$ and provides at output the k safety control signals $SET_1 \ldots SET_k$ for the safety-critical pins/pads SCP.

Figure 8:
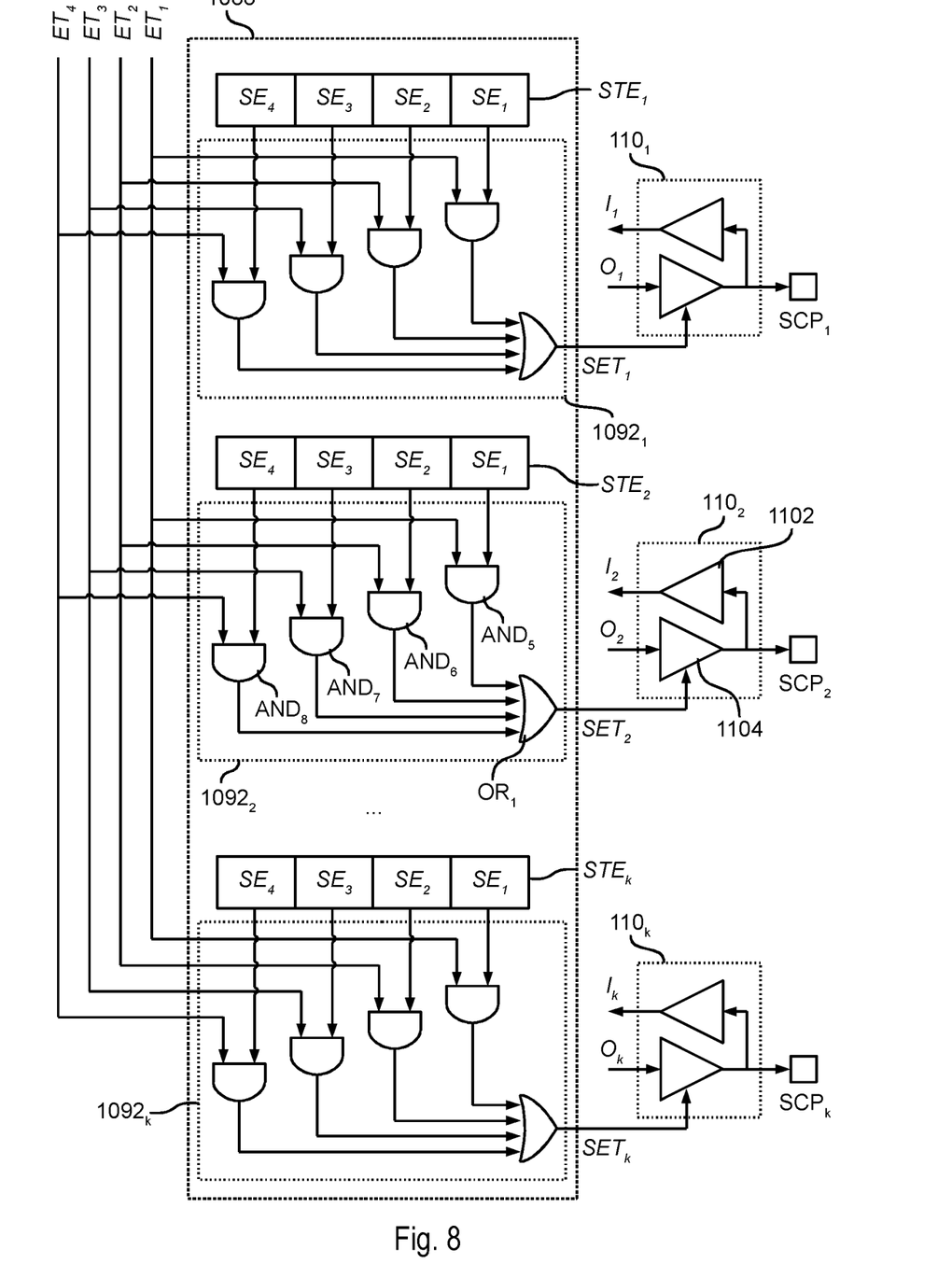

For example, FIG. 8 shows a possible embodiment of the circuit 1086.

Specifically, as mentioned before, the combinational logic circuit 1084 receives at input the combined error signals $ET_1 \ldots ET_m$, for example four error trigger signals $ET_1$, $ET_2$, $ET_3$ and $ET_4$, and provides at output the safety control signals $SET_1 \ldots SETk$ for the safety-critical pins/pads $SCP_1 \ldots SCP_k$.

In the embodiment considered, the circuit 1086 includes for each safety control signal $SET_1 \ldots SET_k$ a corresponding combinational circuit $1092_1 \ldots 1092_k$. Specifically, each of the circuits $1092_1 \ldots 1092_k$ receives at input the combined error signals $ET_1 \ldots ETm$ generated by the circuit 1084 and provides at output a respective safety control signal $SET_1 \ldots SET_k$.

Specifically, in the embodiment considered, the routing of the combined error signals $ET_1 \ldots ET_m$ within each circuits $1092_l$ (with l=1 . . . k) may be specified via a respective set of safety routing information bits $STE_l$, i.e. $STE_1 \ldots STE_k$, specifying the combined error signals $ET_1 \ldots ET_m$ to be routed to the respective safety-critical pin/pad SCP.

For example, in various embodiments, each circuit $1092l$ may implement a multiplexer and the respective set of routing information bits $STE_l$ is used to select one (or possibly none) of the combined error signals $ET_1 \ldots ET_m$ to be routed to the respective safety-critical pin/pad $SCP_l$.

Conversely, in the embodiment shown in FIG. 8, the set of routing information bits $STE_l$ for a given safety-critical pin/pad $SCP_l$ includes a respective enable bit $SE_1 \ldots SE_m$ for each combined error signal $ET_1 \ldots ET_m$ indicating whether the respective error trigger signal $ET_1 \ldots ET_m$ should be forwarded to the given safety-critical pin/pad $SCP_l$.

For example, again assuming that the routing is enabled when the respective enable bit SE is set to high, each block $1092l$ may implement the following logic operation:

$$SET_1 = OR_{(j=1\ldots m)}\{SE_{j,1} \text{ AND } ET_j\}$$

where $SE_{j,l}$ indicates that the corresponding bit $SE_j$ belongs to the set of routing information bits $STE_l$. For example, in the exemplary embodiment, the safety control signal $SET_1$ may be expressed as:

$SET_1 = SE_{1,1}$ AND $ET_1$ OR $SE_{2,1}$ AND $ET_2$ OR $SE_{3,1}$ AND $ET_3$ OR $SE_{4,1}$ AND $ET_4$.

For example, again assuming four combined error signals ET, each block $1092l$ may include four logic AND gates $AND_5, AND_6, AND_7$ and $AND_8$ and a logic OR gate $OR_1$ for implementing the above equations.

Generally, the safety control signals SET may not necessarily be identical to the respective error trigger signal ET, but the signal may also correspond, e.g., to an inverted version of the respective combined error signal ET. For example, for this purpose, the AND operations may be replaced with XOR operations.

In the embodiment considered, each safety control signals SET is provided to a respective safety-critical pin/pad SCP for controlling the state of the pin. Specifically, each pin of the processing system ma is usually associated with an interface circuit 110. Specifically, as shown with respect to the interface 1102, an interface circuit 110 of a safety-critical pin SCP includes an output buffer 1104 for driving the respective pin SCP as a function of an output signal O. In case of an input/output pin, the interface circuit 110 may also include an input buffer $110_2$ for acquiring an input signal I indicate of the signal applied to the respective pin. For example, in order to use the pin as input pin, the output buffer 1104 may be deactivated, thereby placing the pin in a high-impedance state. For example, in case of digital signals I and O, the input buffer 1102 and output buffer 1104 may be implemented with Schmitt triggers. However, generally, the output signal O may also be an analog signal.

In the embodiment considered, the output buffer 1104 of a given safety-critical pin SCP may thus be configured to drive the respective pin SCP as a function of the respective safety control signal SET. For example, the output buffer 1104 may set the electric level of the respective safety-critical pin, e.g. to a given logic level (e.g. high or low) or to a high-impedance state. In various embodiments, each set of routing information bits STEl may thus contain also one or more bits (which are provided to the respective output buffer 1104) for configuring the electric level to which the respective safety-critical pin SCP should be set in case the respective safety control signal SET is set.

Thus, by setting the bits $SE_i$ of the set of safety routing information bits $STE_l$, the system and/or software developer may decide which combined error signals ET should be router to which safety-critical pin SCP, thereby controlling the operation of the safety-critical pins SCP, in particular in order to place the safety-critical pins SCP in a safety state. For example, as mentioned before, only critical hardware error may be routed to the error pin $EP_1$, in order to take suitable measures in order to maintain the whole system in a safety state. Conversely, any kind of error may be routed to the error pin $EP_2$, e.g. in order to implement an error log function. Accordingly, in this case, the information provided to the pin $EP_1$ is safety relevant and the designer may set the bit $SE_1$ of the set of safety routing information bits $STE_1$ in order to forward the combined error signal $ET_1$ not only to the error pin $EP_1$, but also to one or more safety-critical pins SCP (in particular the respective interface circuit 110), thereby placing the respective safety-critical pin SCP in a safety state.

Also in this case, the bits SE of the set of routing information bits STE may be organized in various modes. For example, each set of routing information bits STE may be stored in a respective register, i.e. one for each safety control signal SET. Similarly, all bits SE associate with a given combined error signal ET may be stored in a respective register, i.e. one for each combined error signal ET.

In the previous embodiments, the combined error signals ET and the safety control signals SET have thus a first logic level (e.g. low) when none of the errors enabled via the bits EOUT and SE is set. Conversely, the combined error signals ET and the safety control signals SET have a second logic level (e.g. high), when at least one of the errors is enabled via the bit EOUT and the respective bit SE is set.

Figure 9:
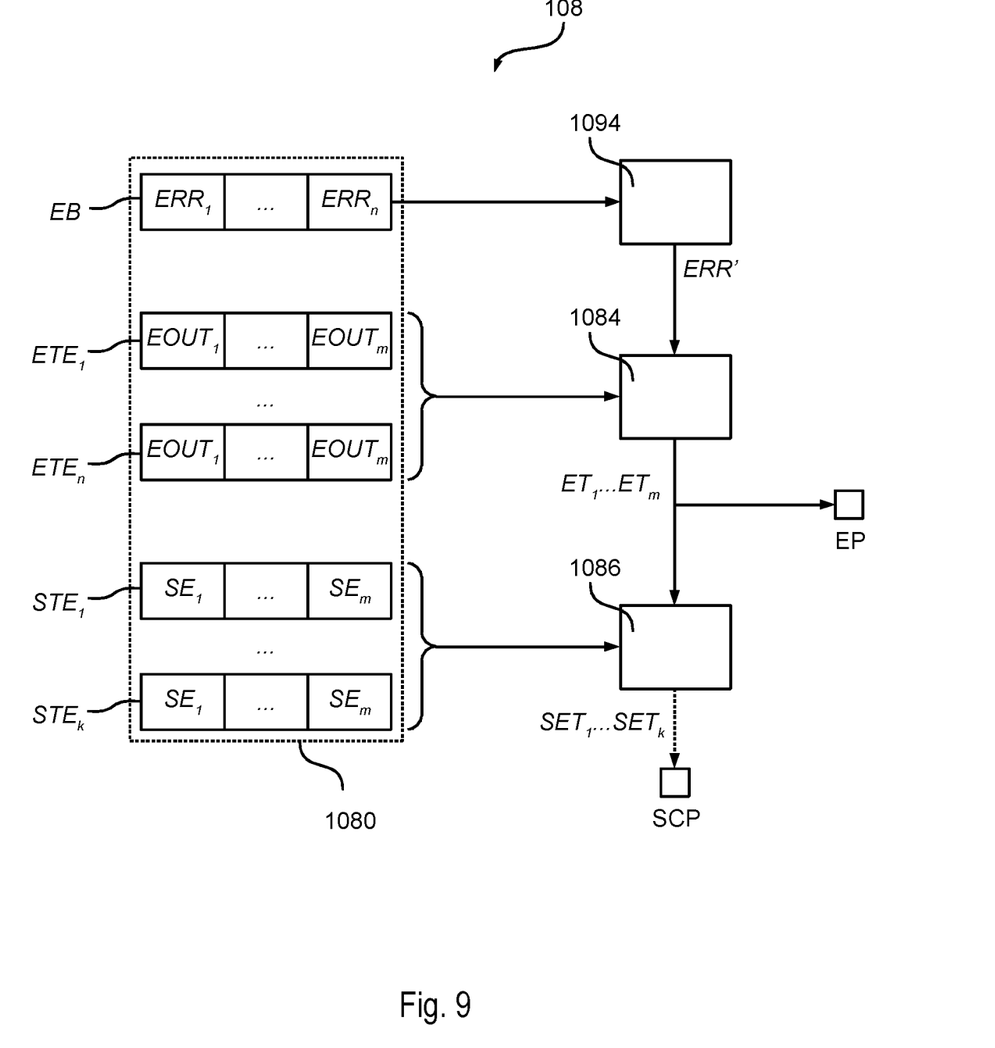
FIG. 9 shows a third embodiment of the fault collection circuit of FIG. 3.

Conversely, FIG. 9 shows an embodiment, wherein the error trigger generator circuit 1084 does not receive at input directly the error bits EB or the error signals ERR, but an additional circuit 1094 is connected between the error bits EB/the error signals ERR and the error trigger generator circuit 1084.

Specifically, as mentioned before, the circuits 1084 and 1086 essentially correspond to two routing circuits, i.e.:
the routing circuit 1084 is configured to forward the signals received at input to the error pins EP as a function of the configuration bits EOUT; and
the routing circuit 1086 is configured to forward the signals at the output of the routing circuits 1084 to the safety-critical pins SCP as a function of the configuration bits SE.

Accordingly, the circuit 1094 may perform different operations on the error bits EB/the error signals ERR before the processed data ERR' are provide at input to the routing circuit 1094. For example, the circuit 1094 may be configured to:
select only a subset of the error signals ERR and/or combine a plurality of error signals ERR, thereby reducing the number of signals ERR' provided to the routing circuit 1084; and/or
mask given errors ERR, i.e. these errors are never signaled to the circuit 1084; and/or
trigger a given error ERR, e.g. for test purposes.

Accordingly, the register 1080 may also include one or more configuration bits for configuring the operation of the circuit 1094.

In various embodiments, the circuit 1094 may generate for each error signal ERR a respective serial bit sequence when the respective error signal ERR is set, wherein a different bit sequence is associated with each error signal ERR. Accordingly, instead of providing an undistinguishable error trigger signal ET at each error pin EP, each signal ET may indeed correspond to a bit sequence indicative of a respective error.

Accordingly, generally, the processing system 10*a* includes at least two error pins EP (m≥2). In the embodiment described, the fault collection circuit 108 receives at input a plurality of error signal ERR generated by the various circuits of the processing system 10*a*, and generates combined error signals ET for the error pins EP. Specifically, the fault collection circuit 108 is configured to selectively forwards the error signals ERR to the error pins EP. For this purpose, the fault collection circuit 108 includes a first routing circuit 1084 configured to generate the combined error signals ET by selectively forwarding the error signals ERR to the error pins EP as a function of a first set of configuration bits EOUT.

In various embodiments, one or more (k≥1) pins of the processing system ma are safety-critical pin SCP associated with an interface circuit configured to selectively set the electric level of the respective pin as a function of a safety control signal SET. In this case, the fault collection circuit 108 generates also the safety control signals SET for the safety-critical pins SCP. Specifically, in various embodiments, the fault collection circuit 108 includes also a second routing circuit 1086 configured to generate the safety control signals SET by selectively forwarding the combined error signals ET to the safety-critical pins SCP as a function of a second set of configuration bits SE.

As mentioned before, the fault collection circuit 108 may also be configured to store (via the register 1080) the error signals ERR and/or elaborate the error signals ERR (via the circuit 1094) before the signals are provided to the first circuit 1084.

Of course, without prejudice to the principle of the invention, the details of construction and the embodiments may vary widely with respect to what has been described and illustrated herein purely by way of example, without thereby departing from the scope of the present invention.

What is claimed is:

1. A method to route critical error messages through an error routing circuit, the method comprising:
routing a first error signal to a critical error pad of the error routing circuit as indicated by a first critical-error-pad routing bit; and
routing a second error signal to the critical error pad as indicated by a second critical-error-pad routing bit.

2. The method of claim 1, wherein routing the first error signal to the critical error pad comprises delivering the first error signal and the first critical-error-pad routing bit to a first AND gate.

3. The method of claim 2, wherein routing the second error signal to the critical error pad comprises delivering the second error signal and the second critical-error-pad routing bit to a second AND gate.

4. The method of claim 3, further comprising combining the first error signal and the second error signal before routing the first error signal to the critical error pad and before routing the second error signal to the critical error pad.

5. The method of claim 4, wherein combining the first error signal and the second error signal comprises providing an output of the first AND gate and an output of the second AND gate to an OR gate, the output of the OR gate being provided to the critical error pad.

6. The method of claim 5, further comprising using the output of the OR gate to set an electric level of a safety critical pad.

7. The method of claim 1, further comprising routing the first error signal to a redundant critical error pad as indicated by a first redundant critical-error-pad routing bit for the first error signal, the first redundant critical-error-pad routing bit having the same value as the first critical-error-pad routing bit.

8. The method of claim 7, further comprising routing the second error signal to the redundant critical error pad as indicated by a second redundant critical-error-pad routing bit for the second error signal, the second redundant critical-error-pad routing bit having the same value as the second critical-error-pad routing bit.

9. The method of claim 8, wherein routing the first error signal to the redundant critical error pad comprises delivering the first error signal and the first redundant critical-error-pad routing bit to a first AND gate.

10. The method of claim 9, wherein routing the second error signal to the redundant critical error pad comprises delivering the second error signal and the second redundant critical-error-pad routing bit to a second AND gate.

11. The method of claim 10, further comprising combining the first error signal and the second error signal before routing the first error signal to the redundant critical error pad and before routing the second error signal to the redundant critical error pad.

12. The method of claim 11, wherein combining the first error signal and the second error signal comprises providing an output of the first AND gate and an output of the second AND gate to an OR gate, the output of the OR gate being provided to the redundant critical error pad.

13. A routing circuit for critical error messages, the routing circuit comprising:
a first critical AND gate to receive a first error signal and a first critical-error-pad routing bit, the first critical-error-pad routing bit used to indicate routing for the first error signal through the routing circuit;
a first non-critical AND gate to receive the first error signal and a first non-critical-error-pad routing bit, the first non-critical-error-pad routing bit used to indicate routing for the first error signal through the routing circuit;
a second critical AND gate to receive a second error signal and a second critical-error-pad routing bit, the second critical-error-pad routing bit used to indicate routing for the second error signal through the routing circuit;
a second non-critical AND gate to receive the second error signal and a second non-critical-error-pad routing bit, the second non-critical-error-pad routing bit used to indicate routing for the second error signal through the routing circuit;
a critical OR gate, the critical OR gate coupled with an output of the first critical AND gate and an output of the second critical AND gate, an output of the critical OR gate being coupled with a critical error pad; and
a non-critical OR gate, the non-critical OR gate coupled with an output of the first non-critical AND gate and an output of the second non-critical AND gate, an output of the non-critical OR gate being coupled with a non-critical error pad.

14. The routing circuit of claim 13, further comprising:
a first redundant critical AND gate to receive the first error signal and a first redundant critical-error-pad routing bit used to indicate a second routing for the first error signal through the routing circuit;

a second redundant critical AND gate to receive the second error signal and a second redundant critical-error-pad routing bit used to indicate a second routing for the second error signal through the routing circuit; and a redundant critical OR gate coupled with an output of the first redundant critical AND gate and an output of the second redundant critical AND gate, an output of the redundant critical OR gate being coupled with a redundant critical error pad.

15. The routing circuit of claim 13, wherein the routing circuit is configured to receive the first critical-error-pad routing bit from a register.

16. The routing circuit of claim 15, wherein the routing circuit is configured to receive the second critical-error-pad routing bit from the register.

17. A method to route critical error messages through an error routing circuit, the method comprising:

routing a first error signal to a critical error pad of the error routing circuit as indicated by a first critical-error-pad routing bit delivered to inputs of a first critical AND gate, an output of the first critical AND gate being coupled with the critical error pad;

routing a second error signal to the critical error pad as indicated by a second critical- error-pad routing bit delivered to inputs of a second critical AND gate, an output of the second critical AND gate being coupled with the critical error pad;

routing the first error signal to a redundant critical error pad as indicated by a first redundant critical-error-pad routing bit delivered to inputs of a first redundant critical AND gate, an output of the first redundant critical AND gate being coupled with the redundant critical error pad; and routing the second error signal to the redundant critical error pad as indicated by a second redundant critical-error-pad routing bit delivered to inputs of a second redundant critical AND gate, an output of the second redundant critical AND gate being coupled with the redundant critical error pad, and wherein the first critical-error-pad routing bit has the same value as the first redundant critical-error-pad routing bit, and wherein the second critical-error-pad routing bit has the same value as the second redundant critical-error-pad routing bit.

18. The method of claim 17, further comprising combining the first error signal and the second error signal before routing the first error signal to the critical error pad and before routing the second error signal to the critical error pad by providing the output of the first critical AND gate and the output of the second critical AND gate to a first OR gate, the output of the first OR gate being provided to the critical error pad.

19. The method of claim 18, further comprising combining the first error signal and the second error signal before routing the first error signal to the redundant critical error pad and before routing the second error signal to the redundant critical error pad by providing the output of the first redundant critical AND gate and the output of the second redundant critical AND gate to a second OR gate, the output of the second OR gate being provided to the redundant critical error pad.

20. The method of claim 17, wherein a critical OR gate is coupled with an output of the first critical AND gate and an output of the second critical AND gate, an output of the critical OR gate coupled with the critical error pad, the method further comprising:

routing the first error signal to a non-critical error pad of the error routing circuit as indicated by a first non-critical error pad routing bit delivered to inputs of a first non-critical AND gate, an output of the first non-critical AND gate coupled with the non-critical error pad;

routing the second error signal to the non-critical error pad as indicated by a second non-critical error pad routing bit delivered to inputs of a second non-critical AND gate, an output of the second non-critical AND gate being coupled with the critical error pad, wherein a non-critical OR gate is coupled with an output of the first non-critical AND gate and an output of the second non-critical AND gate, an output of the non-critical OR gate coupled with the non-critical error pad.

\* \* \* \* \*

UNITED STATES PATENT AND TRADEMARK OFFICE
CERTIFICATE OF CORRECTION

PATENT NO. : 11,977,438 B2
APPLICATION NO. : 17/406910
DATED : May 7, 2024
INVENTOR(S) : Roberto Colombo It is certified that error appears in the above-identified patent and that said Letters Patent is hereby corrected as shown below:

On the Title Page

Item (63), in Column 1, under "Related U.S. Application Data", Line 2:
Below "Feb. 28, 2019, now Pat. No. 11,113,136."
Insert -- (30) Foreign Application Priority Data
    Mar. 02, 2018 (IT) ......................... 102018000003234 --.

Signed and Sealed this
Eleventh Day of June, 2024

Katherine Kelly Vidal
*Director of the United States Patent and Trademark Office*